United States Patent [19]

Smith, Jr.

[11] 3,756,683
[45] Sept. 4, 1973

[54] HOLOGRAM IMAGE-SPACE SCALLING
[75] Inventor: Noyes D. Smith, Jr., Bellaire, Tex.
[73] Assignee: Shell Oil Company, New York, N.Y.
[22] Filed: May 3, 1971
[21] Appl. No.: 139,863

Related U.S. Application Data
[63] Continuation-in-part of Ser. No. 852,602, May 19, 1969, abandoned.

[52] U.S. Cl. ............ 350/3.5, 340/15.5, 350/162 SF
[51] Int. Cl. ............................................. G02b 27/38
[58] Field of Search ...................... 350/3.5, 162 SF; 235/181; 340/15.5

[56] References Cited
UNITED STATES PATENTS
3,414,875  12/1968  Driver et al. ................. 350/162 SF OTHER PUBLICATIONS
Schwar et al., "Nature," Vol. 215, July, 1967, pp. 239–241.
Vanderlutg, IEEE Transactions on Information Theory, Vol. IT–10, No.2, Apr. 1964, pp. 139–145.

Primary Examiner—David Schonberg
Assistant Examiner—Ronald J. Stern
Attorney—Theodore E. Bieber et al.

[57] ABSTRACT

The image space of a hologram is analyzed by forming a diffraction-point hologram of a diffraction point at a known distance from the plane on which its hologram is formed and cross-correlating the diffraction-point hologram and the hologram being analyzed. An image is formed in the plane of the cross-correlation when the diffraction point depicted in the diffraction-point hologram is spaced from the plane of its hologram as a diffraction point on the object of the hologram being analyzed is spaced from the plane of its hologram.

28 Claims, 13 Drawing Figures

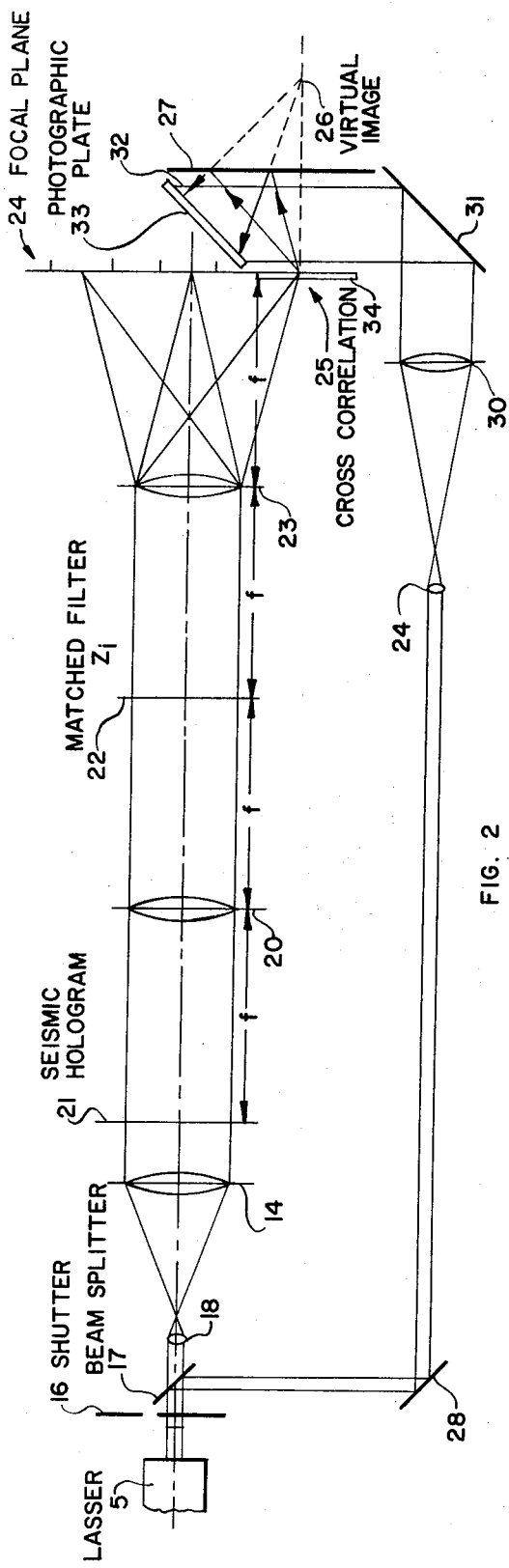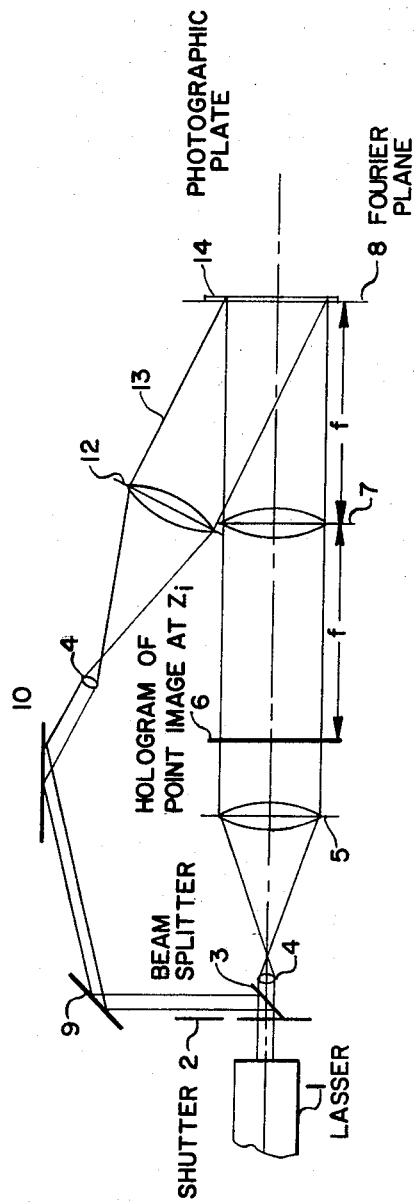
FIG. 2
FIG. 1
INVENTOR:
NOYES D. SMITH, JR.

STEREO VIEWER

INVENTOR:
NOYES D. SMITH, JR.

HOLOGRAM IMAGE-SPACE SCALLING

RELATED APPLICATIONS

This case is a continuation-in-part of application Ser. No. 825,602, filed May 19, 1969 now abandoned.

The present invention is related to the copending patent applications entitled Holographic Seismic Exploration, Ser. No. 659,084, filed Aug. 8, 1967, by Noyes D. Smith, Jr., new U.S. Pat. No. 3,503,037; Producing Acoustic Holograms, Ser. No. 688,920, filed Dec. 7, 1967 by S. P. Cook, U.S. Pat. No. 3,484,740 and Seismic Holography, Ser. No. 813,503, filed Apr. 4, 1969 by N. D. Smith, Jr., U.S. Pat. No. 3,631,384. The copending applications describe procedures by which a seismic hologram can be formed.

BACKGROUND OF THE INVENTION

The present invention relates to the use of holograms to reconstruct a visible three-dimensional image of an object that was illuminated by radiant energy. In a hologram, the portions of the object-illuminating radiant energy that are reflected and diffracted toward a plane along which the hologram is formed are mixed with coherent radiant energy and a visible record is made of the intensities of the interference pattern that is formed by the mixture of radiant energies. A three-dimensional visible image of the object is formed when coherent light is diffracted from the hologram.

The scaling of an image or image space reconstructed from a hologram is inherently related to the wavelength of the radiant energy with which the hologram was formed, the radiant energy with which the image was reconstructed, and the linear dimensions of the plane on which the hologram was formed. The relative linear scales should be kept constant. This is particularly difficult where the radiant energy with which the hologram was formed has a wavelength that is long with respect to that of visible light, the radiant energy with which the image is reconstructed.

For example, as described in the above-referenced copending patent applications, particularly useful holograms can be formed from seismic energy, which has wavelengths of several hundred feet in length. The images of the objects to which such holograms relate are reconstructed with visible light, which has wavelengths in the order of only several millionths of a foot. The dimensions of an array of seismic receiving stations, and thus the dimensions of the plane on which a seismic hologram is formed, may be only about 25 wavelengths of the seismic energy along the longest dimension. In order to provide for a visible reconstruction with the same scaling in the horizontal and vertical direction, the longest dimension of the seismic hologram would need to be reduced to a size in the order of $25 \times 10^{-4}$ inches. None of the currently available recording media for recording visible images have sufficient resolving power to record a hologram within such a space and such a small scale hologram would be too small for useful observation. Although useful seismic holograms can be formed and imaged with from about 15 to 20 times exaggeration of the vertical scale, such an exaggeration causes the relative horizontal locations of the image points to be disadvantageously inaccurate.

SUMMARY OF THE INVENTION

A hologram can be considered to be a sum of holograms of diffracting points. In the present invention, the location of points in the image space of a hologram with respect to the plane on which the hologram was formed is determined by forming cross-correlations of the hologram being analyzed with holograms made with the same reference wave of point sources (or diffraction points) at successively more distant locations thus covering the volume to be reconstructed. At each distance interval a correlation plane is obtained on which the amplitude of the cross-correlation is related to the probability of the occurrence of a point image at that horizontal position in the reconstructed image space. When the holograms are made with the reference wave front parallel to the plane of the hologram and the refractive index variations are such that the wave fronts at the holographic plane can be considered spherical, the holograms of each diffracting point are circularly symmetric and can be transformed into each other by a change in scale. This property simplifies the formation of the cross-correlations. The process of the invention can be carried out on a digital computer or by means of analogue optical processing equipment.

In the optical processing the location of a point in the image space of a hologram with respect to the plane on which the hologram was formed is determined by forming a holographic matched filter (i.e., a Vander Lugt filter) from a hologram of a diffraction point at a known distance from the plane on which its hologram is formed and forming a cross-correlation of the matched filter and the hologram being processed. The distance between an image point in the image space of the hologram being processed and the plane of that hologram is indicated by the analogous distance of a diffraction point from which a matched filter produces an image in the image plane of the cross-correlation. The horizontal position of such an image point is indicated by the position of the image in the plane of the cross-correlation.

If the object from which the hologram was made has a single scattering surface with topography, for a selected distance at which the correlation plane intersects the surface, the cross-correlation will be a contour line of that depth on the surface. By selecting the depth interval between the point-image holograms used in the cross-correlation the entire surface can be contoured at the chosen contour interval.

In one embodiment, the present invention is a process for analyzing a hologram by producing physical qualities that are indicative of the location of a point, within the image space of a hologram, with respect to the plane along which the hologram was formed. It is applicable to holograms formed by substantially any wavelength. In the present process at least one diffraction-point hologram is formed with respect to a diffraction-point that is located a known distance from the plane on which its hologram is formed. The diffraction-point hologram can be formed by substantially any procedure that provides a hologram in which the scaling of image space is substantially equal to that of the hologram being processed. The diffraction-point hologram is converted to a two-dimensional Fourier transform by diffracting coherent light from the hologram and focusing the diffracted light. The focused light that forms the Fourier transform is mixed with a beam of the coherent light from which it was formed and the pattern of the intensities of the resulting mixture of light is visibly displayed to form a holographic matched filter. Such a display can be formed in numerous ways, one of which amounts to simply causing a photographic emulsion to be exposed by the mixture of light. A transparent print of this exposure is a matched filter. The hologram being processed is also converted to a two-dimensional Fourier transform by a diffraction and focusing of coherent light. The focused light that forms the Fourier transform of the hologram being porcessed is diffracted from a holographic matched filter and the diffracted light is focused to form a cross-correlation of the hologram and the filter. The production and use of matched filters is a known optical data processing technique, in respect to pattern recognition procedures. Equipment and technique of a type that can be utilized in the present invention are described in, for example, Introduction to Fourier Optics by J. W. Goodman, Chapter 7, pages 171–183.

In the process of the present invention, the cross-correlation between the hologram and the matched filter forms a correlation-plane which indicates, in a form of the intensity of an image, the probability of the occurrence, in the image space of the hologram being produced, of a diffraction-point that has a relative location corresponding to that of the diffraction-point from which the filter was prepared. The lateral location of such a coincidence diffraction point relative to the plane of the hologram being processed is indicated by the location of the image in the image plane of the cross-correlation.

Since a hologram can be treated as a sum of holograms of individual points of the object being imaged, the present process can be conducted as a series of sequential steps. Where the reference wave that was used in forming the hologram being processed is one in which the wavefronts were parallel to the plane of the hologram, such individual point holograms will be circularly symmetrical, to the extent that the wavefronts which propagate through the material between the object being illuminated and the plane of the hologram are circularly symmetric at the plane of the hologram.

Each of the points that are imaged on the image plane of the cross-correlation can be viewed as a virtual image appearing at a distance from that image plane which is related to the distance between the coincident diffraction-points and the hologram. A three-dimensional image of the object from which the hologram being processed was formed can be provided with a selected ratio, which can be a 1 to 1 ratio, between the orthogonal coordinates of the image. Such an image can be recorded for visual examination, for example, by means of stereo photographic, holographic, television or the like recording techniques.

A single holographic matched filter can be used where the filter is formed from a diffraction-point hologram in which the spacing between the diffraction-point and the plane of the hologram formation is substantially intermediate with respect to the range of such spacings of diffraction-points in the hologram being processed. In forming the cross-correlation of the hologram being processed and such filter, the diffracted light that forms the Fourier transform of the hologram being processed is focused with a focusing means adapted to provide images of variable sizes, such as, for example, a zoom lens. The relative distances corresponding to matches between the filter and the hologram are related to the size of the image of the hologram and thus are related to the image size settings of the focusing means. The same or a similar variable focusing means is used to change the magnification of the diffracted light that forms the cross-correlation, in order to keep the scale of the cross-correlation plane constant.

BRIEF DESCRIPTION OF THE DRAWINGS

The invention will be more easily understood from the following detailed description of a preferred embodiment when taken in conjunction with the attached drawings in which:

FIG. 1 is a simplified diagram of an optical system used to construct a matched filter;

FIG. 2 is a simplified diagram of the optical system used to obtain the cross-correlation of the hologram and the matched filter and one method of recording the virtual images in the reconstructed image space;

DESCRIPTION OF A PREFERRED EMBODIMENT

Figure 3:
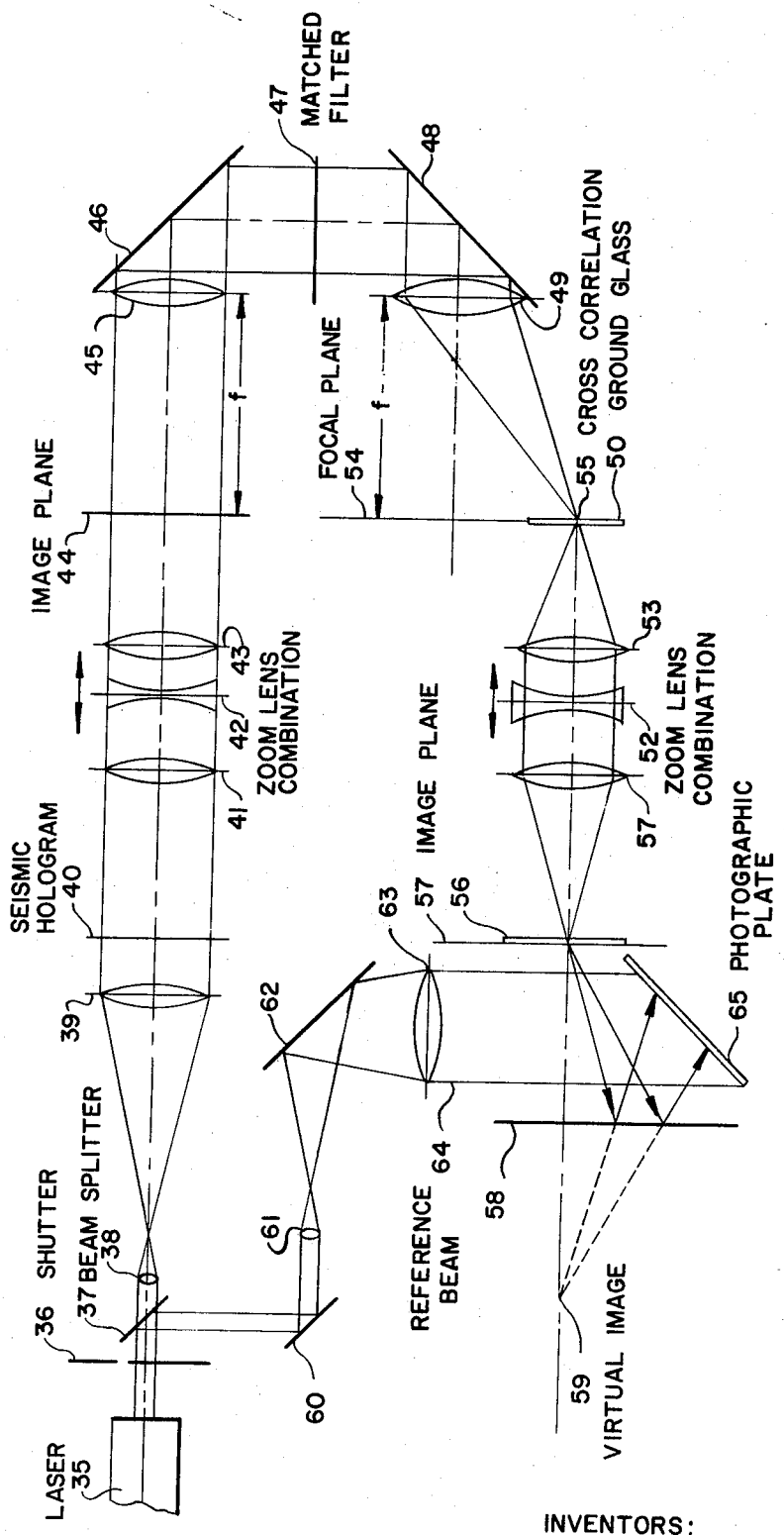
FIG. 3 is a simplified diagram of the optical system used to obtain the cross-correlation of a variable scaled hologram and a single matched filter by continuously scanning through the depth in the image space.

In order to describe the processes of this invention in its simplest form, an embodiment is discussed in which the reconstruction of the image-space from a seismic hologram made with a point source and made with a plane horizontal reference wave is accomplished by successive discrete repetitive steps. If it is desired to construct the image space for a depth range from $Z_1$ to $Z_2$, a series of holograms with a plane horizontal reference wave for each of a number of point sources for depth intervals of approximately a wavelength between $Z_1$ and $Z_2$ must be prepared. These may be prepared by computation, presenting the computed data on a cathode ray tube, and photographing the pattern. They may be prepared by optical processing as taught in the above-mentioned copending application entitled "Seismic Holography" by N. D. Smith, Jr. In using the latter procedure, a single hyperbola corresponding to an image at the selected depth and a single horizontal reference wave, when processed as described in the copending applications, will yield a strip of a hologram for a selected wavelength. This strip, masked so that the location of the source is at one end, can be printed on a rotating photographic plate with the center of rotation at the position of the source to produce a complete diffraction-point hologram. The diffraction-point holograms can also be constructed optically using a point source of laser light, a reference wave, and lenses, to properly scale the resulting hologram.

The method of making the matched filters will be described with reference to FIG. 1. All lenses referred to in the discussion are spherical lenses. In FIG. 1, coherent light from laser 1 passes through shutter 2 when open, through beam splitter 3, lenses 4 and 5 to become an expanded beam of parallel coherent light. This beam illuminates a transparency of the hologram 6 of a point image for a depth $Z_t$ with the same scale as the seismic hologram the image space of which is to be reconstructed. The hologram 6 is in the front focal plane of the lens 7. At the back focal plane 8 of lens 7 is formed a two-dimensional Fourier transform of hologram 6. A beam of light reflected from beam splitter 3 by plane mirrors 9 and 10 is imaged by lens 12. The resulting image at the front focal plane of lens 12 forms a parallel beam 13 which illuminates the Fourier plane 8 at an angle. The resulting interference pattern on plane 8 is recorded on the photographic holographic matched filter. In such a matched filter both amplitude and phase are preserved holographically. The process above is repeated for each diffraction-point hologram required to cover the depth interval of interest.

Now the process of reconstructing the image space of the hologram by means of these matched filters will be described with reference to FIG. 2. Coherent light from laser 15 passes through shutter 16 when open, and through lenses 18 and 19 to become an expanded beam of parallel coherent light. This beam illuminates the seismic hologram 21 located at the front focal plane of lens 20 with the same focal length f as lens 7 which was used to make the matched filter. In the back focal plane of lens 20 is placed the matched filter 22 for a selected depth $Z_1$. Lens 23 is placed so that its front focal plane coincides with the plane of the filter 22. In the back focal plane 24 of lens 23 will appear the zeroth order image, on the optical axis of the system, an upper first order image, which is the convolution of the filter and the hologram, and the lower first order image, which is the cross-correlation of the hologram and the matched filter. At this cross-correlation plane 25 the intensity distribution of light is the probability of occurrence of the point hologram for $Z_t$ in the hologram 21. If, in fact, the hologram for $Z_t$ is in hologram 21, there will be an image on 25 the center of which will be the horizontal position of the image in the image space. A ground glass screen 34 is placed at 25 so that the correlation image can be viewed through a wide angle. A plane mirror 27, parallel to 25 is placed so that the virtual image 26 of 25 will appear with the proper depth scale. As the filters are changed to sequentially cover the depth interval selected, mirror 27 is moved to maintain the proper depth of the virtual image 26 of 25 will appear with the proper depth scale. To record the positions of these images for study and examination, a photographic plate 33 can be positioned to view the virtual images. A reflected beam from beam splitter 17 is reflected by mirror 28 to lenses 29 and 30 which make an expanded beam of parallel light which is reflected by plane mirror 31 onto photographic plate 33 to provide a reference beam for forming a sequence of holograms, one for each depth interval in the image space. Alternatively, the virtual images can be viewed with a stereo camera and a sequence of exposures made for each depth interval to provide a single stereo pair which would cover the image space. The depth scale is determined by the motion of the mirror 27.

Since each hologram of a point source regardless of depth will have a low spatial frequency spectrum that is similar, the addition of a high-pass filter in the Fourier plane with the matched filter improves the discrimination.

While in many practical cases the wavefronts from point sources are circularly symmetric and approximately spherical, the process can be used for asymmetric patterns and in this case the intensity of the image in the correlation plane 25 must be observed as the hologram 21 is rotated about the optical axis of the system.

In the procedure described above a filter had to be constructed for each increment of depth to be reconstructed and the cross-correlation performed at each depth interval. In a second embodiment set forth in FIG. 3, a single matched filter is made for a hologram of a point image at an intermediate depth. The scale of the seismic hologram is changed by an optical system with a zoom lens and the correlations made as a function of the magnification of the hologram. The correlation plane is demagnified by the same amount to maintain a constant horizontal scale and the depth is plotted from the setting of the zoom lens at the proper scale.

In FIG. 3 a coherent beam of light from laser 35 passes through shutter 36, when open, through beam splitter 37 and through lenses 38 and 39 to form an expanded beam of parallel coherent light. This beam illuminates hologram 40, which is located in the object plane of a zoom lens combination of lenses 41, 42 and 43. A zoom lens system provides variable magnification of an object plane on an image plane a fixed distance from the object plane by changes in effective focal length caused by the relative movement of elements of the combination. While a combination of two convex and one concave lens is shown where relative motion of the concave element with respect to the convex elements produces the zoom effect, other more complicated systems may be used. The zoom lens combination 41, 42 and 43 produces an image of the hologram 40 at the image plane 44 magnified by a factor determined by the position of lens 42 with respect to 41 and 43. Lens 45 is located so that the image plane 44 is in the front focal plane of lens 45. The focal length of lens 45 is the same as the lens 7 used to make the matched filter. In FIG. 3, the plane mirrors 46 and 48 are used to fold the system to minimize the space required for the drawing. At the back focal plane of lens 45 is located the matched filter 47 for a chosen intermediate depth. Lens 49 is placed so that its front focal plane coincides with the matched filter 47. As before a correlation plane 55 exists in the front focal plane of lens 49. A ground glass 50 causes the image to be scattered so that it may be viewed over a wide angle. The scale of the horizontal coordinates in the correlation plane is enlarged in proportion to the enlargement of the hologram image 44. A zoom lens combination 51, 52, 53 is adjusted to maintain a constant horizontal scale in the image plane 57. If it is desired to maintain the scale the same as in the original hologram the two lens combinations are identical and their settings are identical. The image on ground glass 56 is viewed as a virtual image in plane mirror 58 as before. A photographic plate 65 is placed so as to view the vertical images 59 in mirror 58 together with a reflected beam from beam splitter 37 reflected by mirror 60 through lens 61, reflected by mirror 62 through lens 63 to form an expanded beam of coherent parallel light which serves as a reference beam. As the shutter 36 is intermittently operated in conjunction with the varying magnification of the zoom lens combinations, a sequence of holograms are recorded on plate 65. When plate 65 is developed and viewed with the reference beam, a scaled reconstructed image space of the original hologram is obtained for examination. Instead of or in addition to the holographic plate a sequence of exposures of a stereo camera set to view the virtual image space on a single stereo plane can be used to record the image space for study. In this embodiment the depth of the image space can be scanned essentially continuously.

If the hologram being analyzed was made on a plane or in or on the surface of a medium in which the refractive index is a known function of position and if the function is such that the wavefronts from point sources are practically spherical, the horizontal and depth scales can be suitably distorted so that the resulting image space will locate the images linearly with respect to the positions of the reflecting interfaces or diffracting points. The depth scale depends on the position of the plane mirror 31 in FIG. 3 and the horizontal scale on the magnification setting of the zoom lens combination 51, 52, 53.

Figure 4:
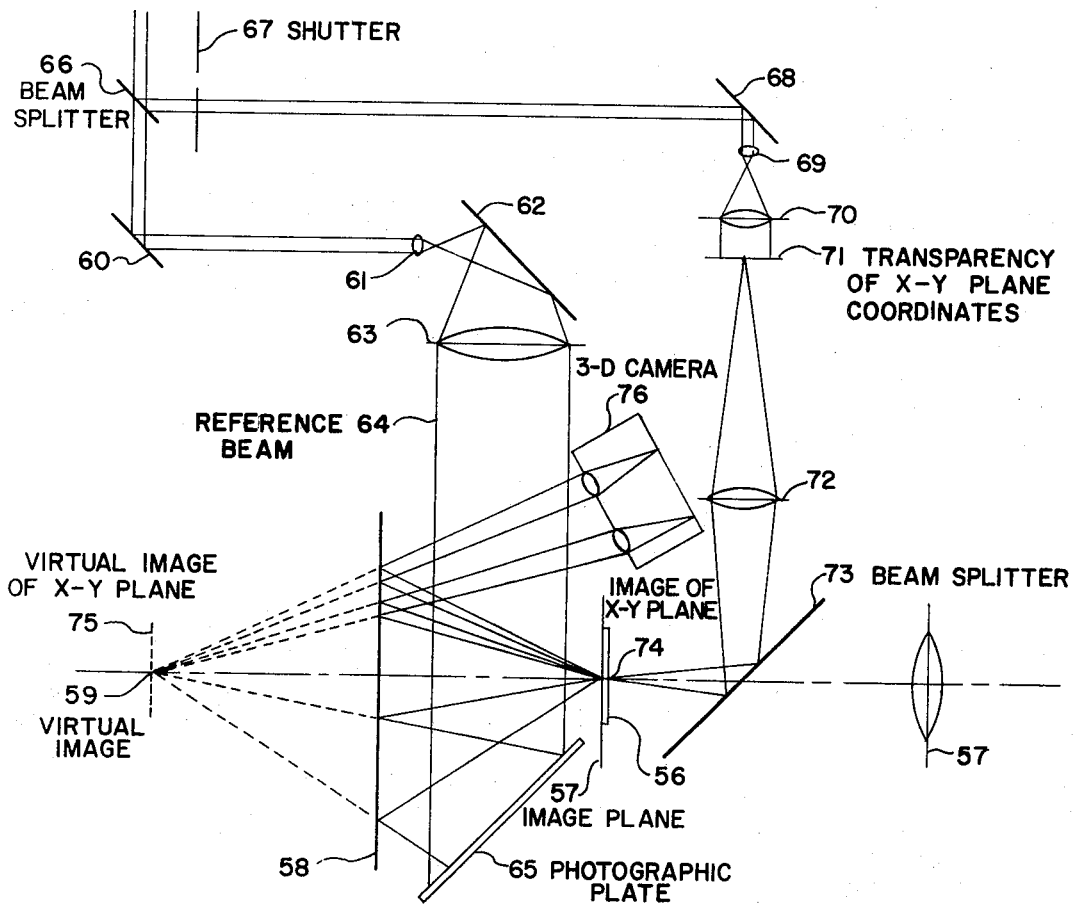
FIG. 4 is a simplified diagram of an optical system to place an image of a scaled reference plane and depth scale into the recorded image space.

FIG. 4 shows a modification of the optical equipment so that a coordinate system in the observaton plane and with depth in the image space can be produced and recorded together with the images. In FIG. 4 an extra beam splitter 66 is introduced before mirror 60 in FIG. 3. Light reflected from 66 passes through shutter 67, when open, to mirror 68 to lenses 69 and 70 which provide a beam to illuminate a transparency 71 of $xy$ plane coordinates or depth markers. By means of lens 72 and beam splitter 73 an image 74 of 71 is focused on the image plane 57 and ground glass 56 of the zoom lens combination ending with lens 51. Thus, by placing a suitable transparency at 71 and opening shutter 67 at times correlated to the depth in the image space, the coordinates can be recorded together with the images either holographically on plate 65 or by the stereo camera 76.

Figure 5:
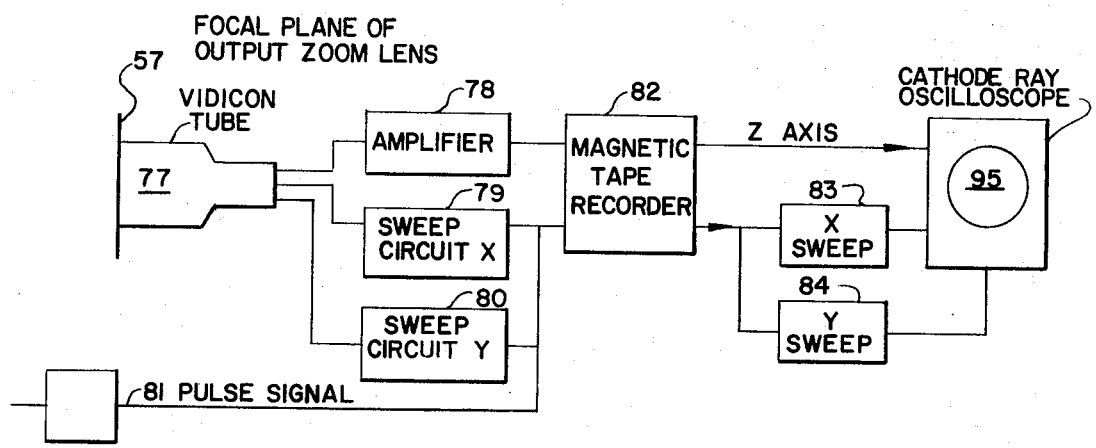
FIG. 5 is a simplified diagram of equipment using a television-type pick-up tube and display cathode ray tube to record and display the reconstructed image space.
Figure 6:
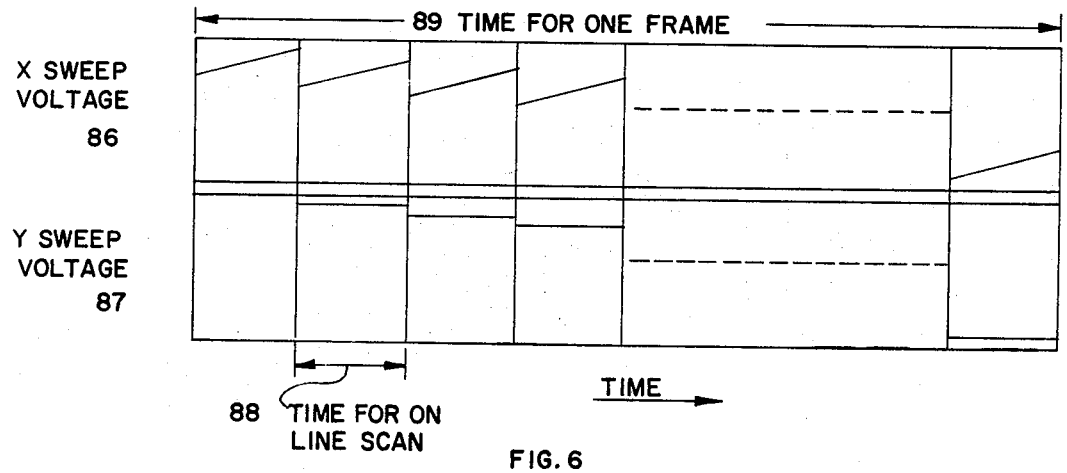
FIG. 6 shows diagrammatically the horizontal and vertical sweep voltage required to present an isometric porjection of the image space produced by the system shown in FIG. 5.
Figure 7:
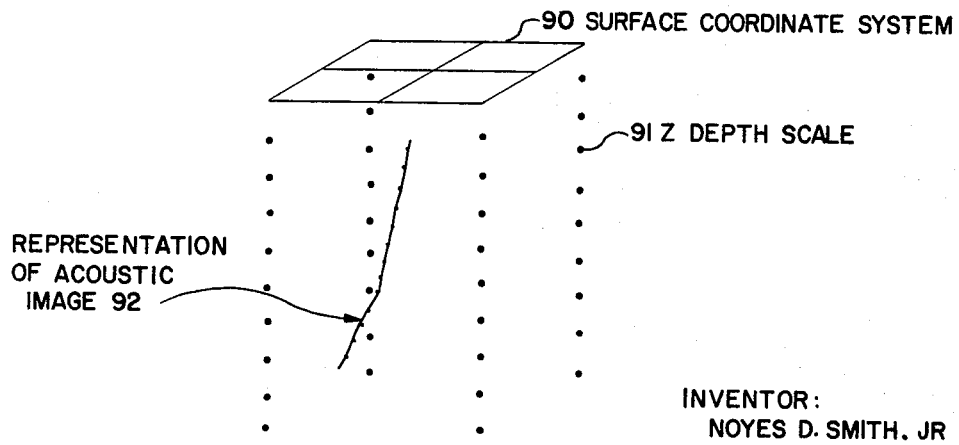
FIG. 7 shows a simplified representation of the image space by the system shown in FIG. 5.

Instead of viewing the correlation plane as a virtual image in a plane mirror, the plane may be observed on the face of a television camera tube such as the Vidicon as shown in FIG. 5. In FIG. 5 the face of the Vidicon tube 77 is placed in 57 the output plane of the zoom lens. A generator 81 sends a synchronizing pulse actuated by the moving element of the zoom lens so that a frame is scanned on the Vidicon face for equal depth movements. The pulse from 81 actuates the sweep circuits 79 and 80. Amplifier 78 supplies the video signal which is stored on magnetic tape 82 together with synchronizing pulses. The information stored on tape 82 can be repetitively reproduced and displayed on cathode ray oscilloscope 85 in various ways. If the $x$ and $y$ sweep circuits 83 and 84 are designed to produce sweep voltages as outlined in FIG. 6 where the $x$ voltage 86 and $y$ voltage 87 are shown as a function of time for each scan line for one frame and where each frame would be displaced vertically as a function of the depth, the image space will be presented as an isometric projection as illustrated in FIG. 7.

Figure 8:
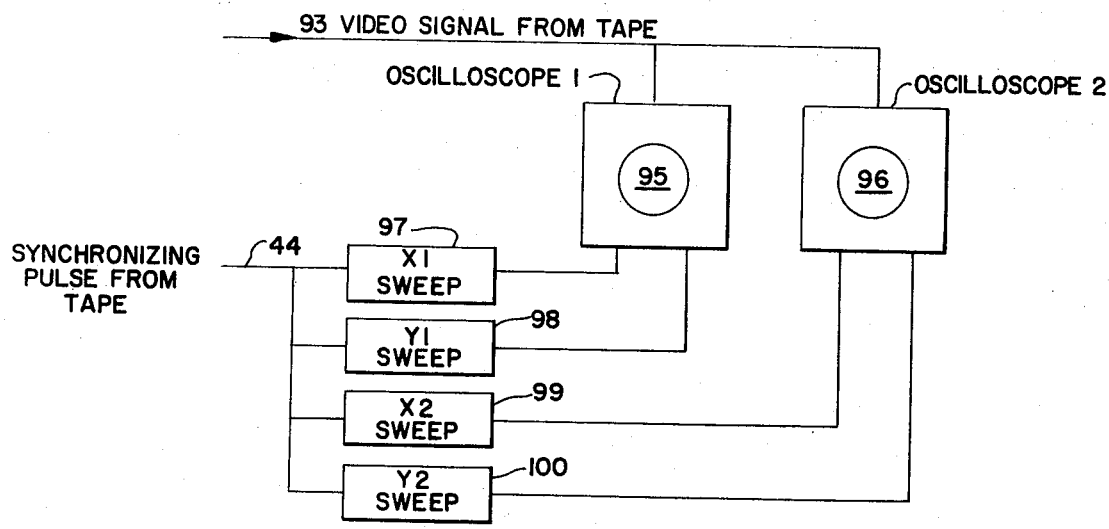
FIG. 8 shows a simplified schematic diagram of a modification of the system shown in FIG. 5 to produce a stereo pair for viewing the image space in three dimensions.
Figure 9:
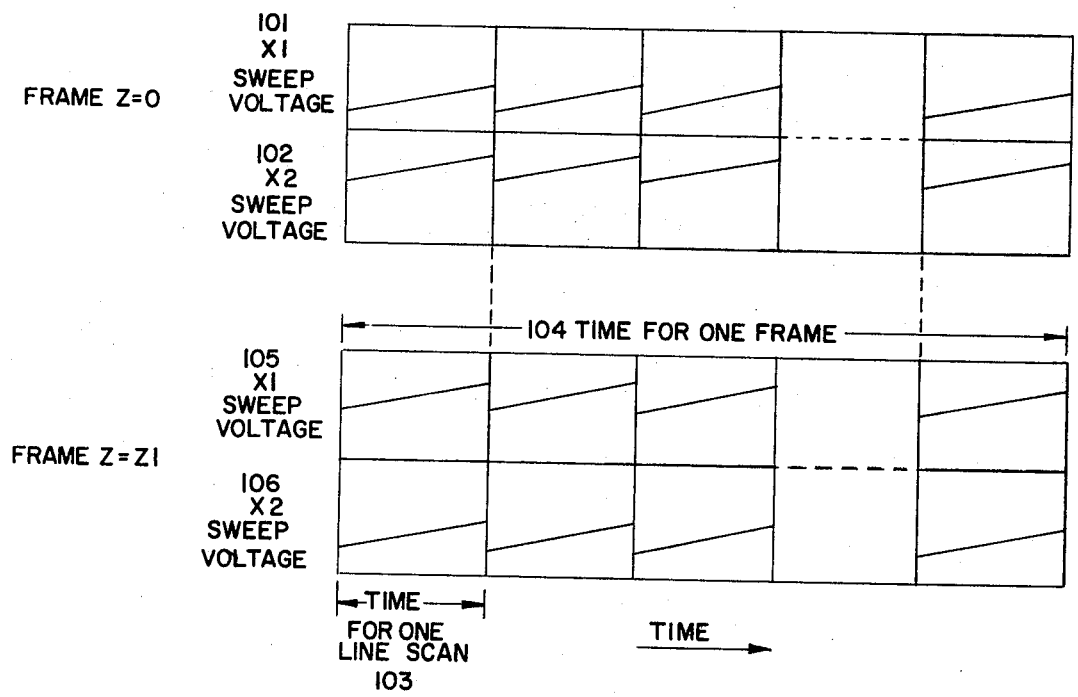
FIG. 9 shows diagrammatically the sweep voltages required to produce the stereo pair in the system shown in FIG. 8.
Figure 10:
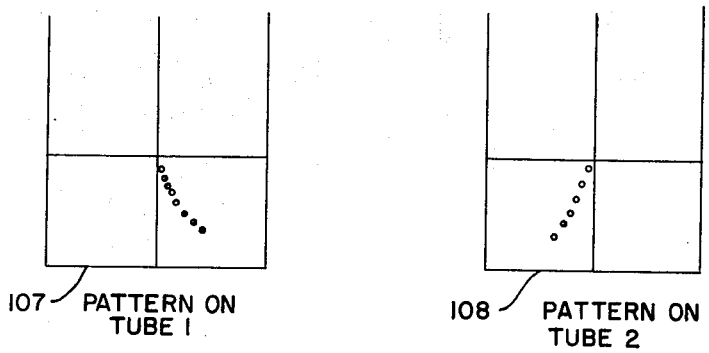
FIG. 10 shows simplified representations of the images on the two cathode ray tubes forming the stereo pair produced by the system shown in FIG. 8.
Figure 11:
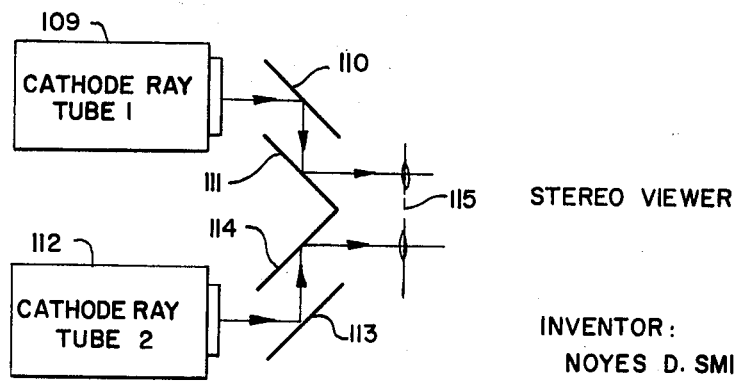
FIG. 11 shows a method of viewing the stereo pair to provide the three-dimensional stereo image of the reconstructed image space.

The information stored on the magnetic tape can be presented on two oscilloscopes in such a manner as to produce a stereo-pair as shown schematically in FIG. 8. The video signal 93 from the magnetic tape is presented simultaneously to the $z$ axis (intensity of the beam) of oscilloscope 1, 95 and oscilloscope 2, 96. The synchronizing pulse actuates the sweep voltage generating circuits 97, 98, 99 and 100. The sweep voltages are such that each scan line in each frame has the same $y$ coordinates (vertical coordinates) but the position of each frame is shifted a constant $x$ (horizontal coordinates) proportional to the depth corresponding to the frame. The frame is shifted to the right on 95 and to the left on 96. However, one frame may be unshifted and only the other shifted to produce a stereo pair. FIG. 9 shows schematically how the sweep voltages $x_1$, 101 and $x_2$, 102 for frame $Z = 0$ vary for a scan line time 103 and a frame time 104 and the values of $x_1$, 105 and $x_2$, 106, for frame $Z = Z_i$. FIG. 10 shows schematically the pattern, 107 on tube 1, and the pattern 108 on tube 2 which form a stereo pair. FIG. 11 illustrates the manner in which this stereo pair can be viewed. FIG. 11 is a cross-sectional plan view. The image on tube 1, 109 is viewed by the right eye at the viewer 115 by means of mirrors 110 and 111. The left eye views the face of cathode ray tube 2, 112 by means of mirrors 113 and 114.

As before in the case of varying refractive index the horizontal and vertical scales can be varied in the optical processing. However, the scale changes can be accomplished in the programming of the sweep circuits.

Figure 12:
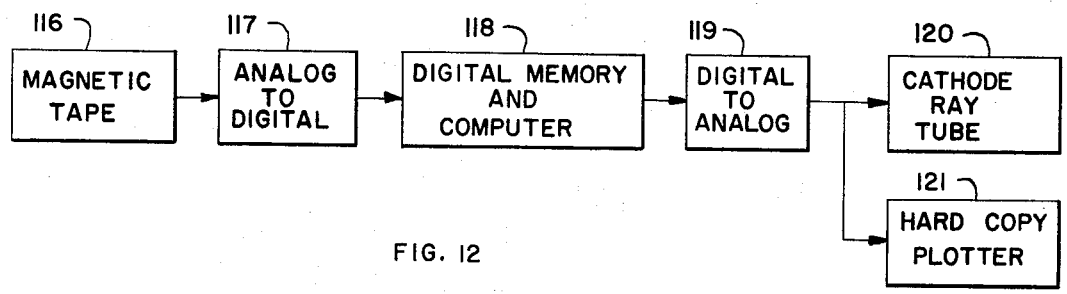
FIG. 12 shows schematically a system for digitizing the analog data describing the reconstructed image space, for storing the digital data in a digital computer memory, for processing the data and/or combining it with previously recorded data for presentation.

The information from the magnetic tape containing the description of the image space may be digitized, stored, processed by digital computer and presented in various forms as shown schematically in FIG. 12. The analog information on magnetic tape 116 is processed by analog-to-digital converter 117. The output of 117 is stored in the memory of digital computer 118. The digital computer can be programmed so that isometric or stereo pairs can be produced which view the image space from any angle. Programming for these types of processing has been carried out in project MAC at the Massachusetts Institute of Technology in Cambridge, Mass. Various thresholds and nonlinear processing may be used selectively to enhance images in a certain intensity range. Data from overlapping holographic image spaces may be combined and presented in one view.

Figure 13:
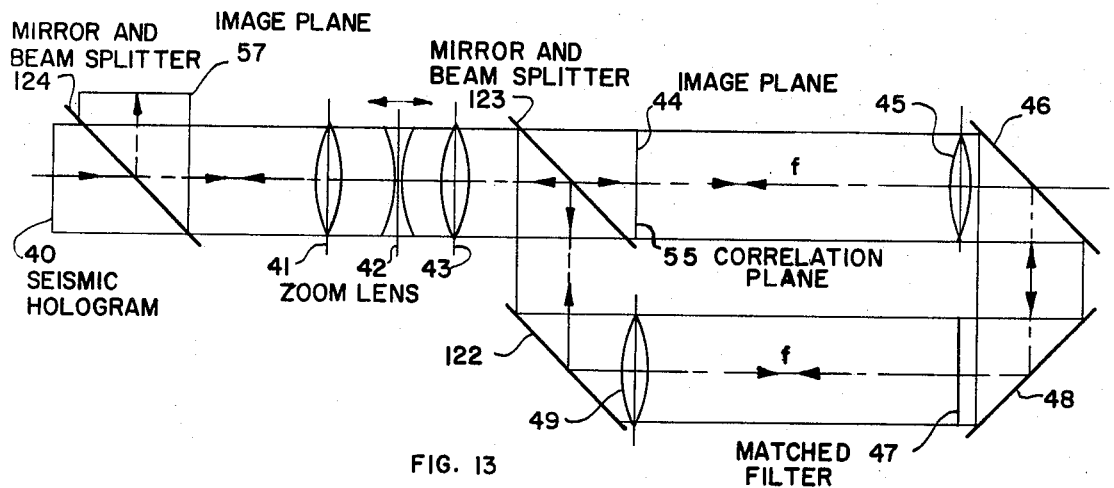
FIG. 13 shows diagrammatically a modification of part of the optical system shown in FIG. 3 so that a single zoom lens can be used to simultaneously enlarge the image of the hologram and diminish the image of the correlation plane so that the horizontal scale remains constant.

In FIG. 3 two zoom lenses are shown. In FIG. 13 a folded system which permits the use of a single zoom lens is shown diagrammatically. In FIG. 13 light from the illuminated seismic hologram 40 passes through beam splitter 124, through the zoom lens combination 41, 42, 43, through beam splitter 123 to be imaged in plane 44. Lens 45 is positioned so that plane 44 is in its front focal plane. Mirrors 46 and 48 fold the beam to the back focal plane of lens 45 where the matched filter 47 is placed. Lens 49 is placed one focal length in front of 47. Be means of mirror 122 and beam splitter 123, the back focal plane 55 is brought into coincidence with plane 44. This plane is imaged by the zoom lens and beam splitter 124 to image plane 57.

In this case the horizontal scale must remain fixed. Consequently for holograms in media with varying refractive index only the systems using a television camera tube with variable scale accomplished by sweep circuits or digital computer are suitable.

Except for plane mirrors, lenses were used in the discussion of the optical processing equipments. Reflecting concave and convex mirrors can be used instead of lenses and reflecting replicas can be used instead of transparencies for the holograms and for the matched filter.

While in describing the reconstruction of the hologram by digital or optical processing the cross-correlation plane has been referred to as the plane of reconstruction, the convolution plane is the same as the cross-correlation plane except for a change in sign of the coordinates. Consequently each step described above can be carried out for the convolution plane. Formally this is true because the cross-correlation of two functions and the convolution of two functions are both transforms of the two functions and differ only in a change in sign of the coordinates and in taking the complex conjugate of the function. Since the holograms described are even functions, they are unchanged by a change of sing and since both functions being cross-correlated are rea, they and their complex conjugates are identical.

While this invention is of particular value in seismic and acoustic holography, it can be used for any holographic reconstruction.

While the processes of this invention have been described for holograms made with point sources, various sources can be used such as multipoint or continuous area sources and the reconstruction made from matched filters of point images. The holograms do not necessarily have to be sampled over a continuous area, but may be confined to one or more lines or curves. Filters made and oriented with the same pattern as the hologram are preferred and will give the sharpest correlations.

In general, the wave energy that is used to form holograms that are analyzed by the present process can be substantially any form of wave energy, such as seismic, sonar, ultrasonic, radar, magneto-hydrodynamic or other wave types including surface or boundary layer wqves for examining plane geometrics. The object or surface from which such a hologram is produced can be any that is adapted to reflect and diffract the waves and is surrounded by a medium through which those waves can propagate.

It is often convenient to make Gabor-type holograms, i.e., where the object is very transparent and the unscattered illuminating wave serves as the reference wave, or holograms with reference waves parallel to the holographic plane. When such holograms are reconstructed with coherent light the two first order and zeroth order images are colinear and thus interfere. The present invention provides a process whereby the image space of such a hologram can be reconstructed free from overlap of other images as though the hologram had been made with an off-axis reference wave.

I claim as my invention:

1. A process of analyzing a hologram, which process comprises:
   producing a diffraction-point hologram of a diffraction point at a known distance from the plane of the diffraction-point hologram; and
   cross-correlating the diffraction-point hologram with the hologram being analyzed to form a cross-correlation image plane that contains an image when the diffraction point depicted in the diffraction-point hologram is spaced from the plane of the diffraction-point hologram as a diffraction point on the object of the hologram being analyzed is spaced from the plane of the hologram being analyzed.

2. The process of claim 1, wherein an image is reconstructed from the hologram being analyzed with respect to the portion of the object of the hologram being analyzed that is spaced from the plane of that hologram as the diffraction point is spaced from the plane of the diffraction-point hologram, by forming a virtual image of the image that is contained on the image plane of the cross-correlation.

3. The process of claim 2, wherein a plurality of said virtual images are formed in order to form a composite three-dimensional reconstruced image of a plurality of portions of the object of the hologram being analyzed.

4. The process of claim 3, wherein:
   said composite reconstructed image is recorded on means for recording the intensity distribution of light diffracted from said image; and
   the light diffracted from said image is mixed with a reference beam of the coherent light used to reconstruct said image in order to form a hologram of said image on said recording means.

5. The process of claim 4, wherein the hologram being analyzed is one in which the reference wave was parallel to the plane on which the hologram was formed and the hologram that is formed on said recording means depicts the same object in a hologram from which the reconstructed image is formed on an axis divergent from that of the zeroth order image.

6. The process of claim 2, wherein the coordinates of said virtual images are adjusted with respect to variations in the refractive indexes of materials between the object and the plane of formation of the hologram being analyzed to locate said virtual images substantially linearly with respect to said plane of formation.

7. An optical method for analyzing a hologram, comprising:
   producing a hologram of a diffraction-point at a known distance from the plane along which the hologram was formed;
   diffracting coherent light from a diffraction-point hologram and focusing the diffracted light to form a two-dimensional Fourier transform;
   mixing the focused light that forms a transform of a diffraction-point hologram with a reference beam of the coherent light that was diffracted from that hologram and visibly displaying the intensity distribution of the mixture of light to form a holographic matched filter;

diffracting coherent light from the hologram being processed and focusing the diffracted light to form a two-dimensional Fourier transform; and diffracting the focused light that forms the transform of the hologram being processed from a holographic matched filter and focusing the diffracted light to form a cross-correlation of the hologram and the filter.

8. The process of claim 7, wherein:

holographic matched filters are formed from each of a series of holograms of diffraction-points at different distances from the planes along which their holograms were formed; and cross-correlations are formed between the hologram being processed and each of a plurality of holographic matched filters.

9. The process of claim 7, wherein:

a holographic matched filter is formed from a hologram of a diffraction-point at a distance from the plane of hologram formation that is intermediate the range of corresponding distances relative to diffraction-points in the hologram being processed; and variable-focus focusing means are utilized to form cross-correlations between the holographic matched filter and the hologram being processed at each of a plurality of magnifications.

10. The process of claim 7, wherein:

the focused diffracted light that forms a cross-correlation is focused to form a virtual image of the image formed in the image plane of the cross-correlations; and a visible record is formed of the virtual image.

11. The process of claim 7, wherein the hologram being processed was formed from radiant energy having a wavelength that is long relative to a wavelength of visible light.

12. The process of claim 7, wherein the hologram being processed was formed from seismic energy.

13. The process of claim 7, wherein the hologram being processed is one in which the reference wave from which the hologram is formed was substantially parallel to the plane on which the hologram was formed.

14. The process of claim 13, wherein at least one substantially circularly-symmetrical diffraction-point hologram is used to form a holographic matched filter.

15. A process of analyzing a hologram, which process comprises:

producing a diffraction-point hologram of a diffraction point at a known distance from the plane of the diffraction-point hologram; and performing a convolution of the diffraction-point hologram with the hologram being analyzed to form a convolution image plane that contains an image when the diffraction point depicted in the diffraction-point hologram is spaced from the plane of the diffraction-point hologram as a diffraction point on the object of the hologram being analyzed is spaced from the plane of the hologram being analyzed.

16. The process of claim 15, wherein an image is reconstructed from the hologram being analyzed with respect to the portion of the object of the hologram being analyzed that is spaced from the plane of that hologram as the diffraction point is spaced from the plane of the diffraction-point hologram, by forming the virtual image of the image that is contained on the image plane of the convolution.

17. The process of claim 16 wherein a plurality of said virtual images are formed in order to form a composite three-dimensional reconstructed image of a plurality of portions of the object of the hologram being analyzed.

18. The process of claim 17, wherein:

said composite reconstructed image is recorded on means for recording the intensity distribution of light diffracted from said image; and the light diffracted from said image is mixed with a reference beam of the coherent light used to reconstruct said image in order to form a hologram of said image on said recording means.

19. The process of claim 18, wherein the hologram being analyzed is one in which the reference wave was parallel to the plane on which the hologram was formed and the hologram that is formed on said recording means depicts the same object in a hologram from which the reconstructed image is formed on an axis divergent from that of the zeroth order image.

20. The process of claim 16 wherein the coordinate of said virtual images are adjusted with respect to variations in the refractive indexes of materials between the object and the plane of formation of the hologram being analyzed to locate said virtual images substantially linearly with respect to said plane of formation.

21. An optical method for analyzing a hologram, comprising:

producing a hologram of a diffraction-point at a known distance from the plane along which the hologram was formed;

diffracting coherent light from a diffraction-point hologram and focusing the diffracted light to form a two-dimensional Fourier transform;

mixing the focused light that forms a transform of a diffraction-point hologram with a reference beam of the coherent light that was diffracted from that hologram and visibly displaying the intensity distribution of the mixture of light to form a holographic matched filter;

diffracting coherent light from the hologram being processed and focusing the diffracted light to form a two-dimensional Fourier transform; and diffracting the focused light that forms the transform of the hologram being processed from a holographic matched filter and focusing the diffracted light to form a convolution of the hologram and the filter.

22. The process of claim 21 wherein:

holographic matched filters are formed from each of a series of holograms of diffraction-point at different distances from the planes along which their holograms were formed; and convolutions are formed between the hologram being processed and each of a plurality of holographic matched filters.

23. The process of claim 21 wherein:

a holographic matched filter is formed from a hologram of a diffraction-point at a distance from the plane of hologram formation that is intermediate the range of corresponding distances relative to diffraction-points in the hologram being processed; and variable-focus focusing means are utilized to form convolutions between the holographic matched filter and the hologram being processed at each of a plurality of magnifications.

24. The process of claim 21 wherein:
the focused diffracted light that forms a convolution is focused to form a virtual image of the image formed in the image plane of the convolution; and a visible record is formed of the virtual image.

25. The process of claim 21, wherein the hologram being processed was formed from radiant energy having a wavelength that is long relative to a wavelength of visible light.

26. The process of claim 21, wherein the hologram being processed was formed from seismic energy.

27. The process of claim 21 wherein the hologram being processed is one in which the reference wave from which the hologram is formed was substantially parallel to the plane on which the hologram was formed.

28. The process of claim 27, wherein a least one substantially circularly-symmetrical diffraction-point hologram is used to form a holographic matched filter.

* * * * *